United States Patent

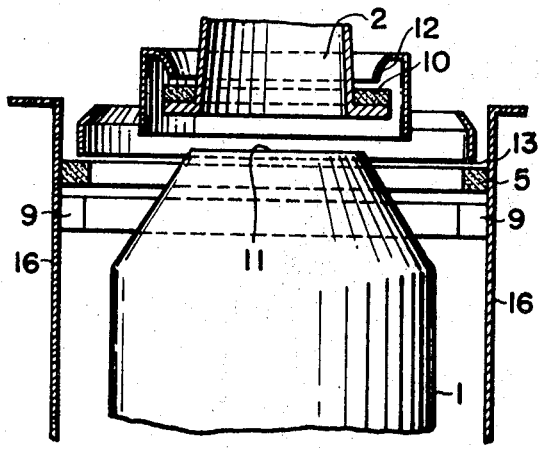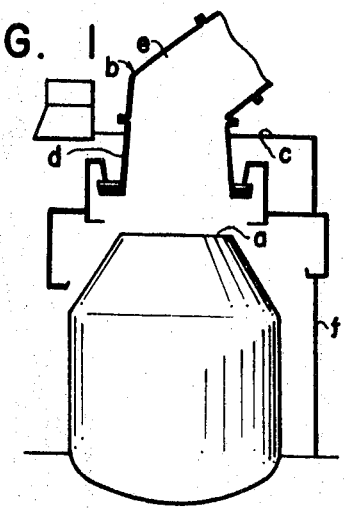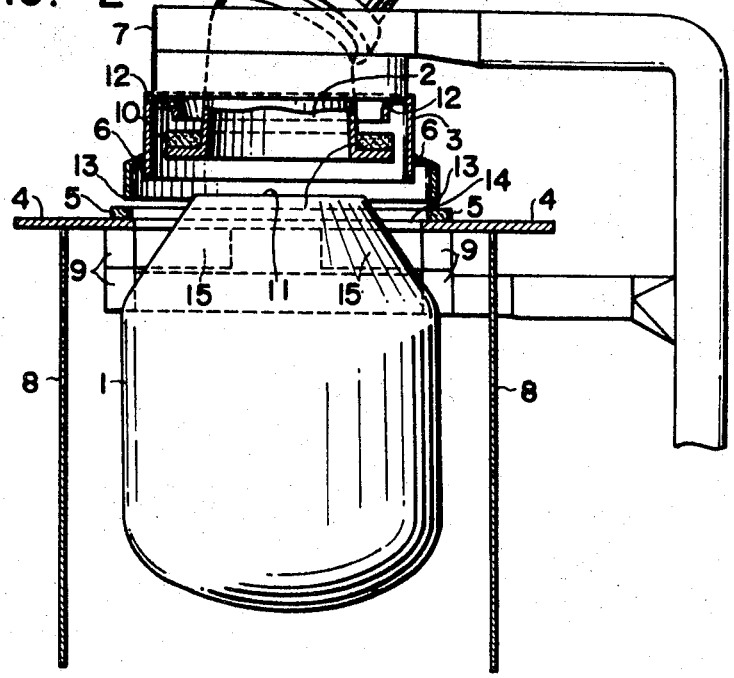

[11] 3,558,116

[72] Inventors Yasuhiro Yagi
 Okayama-shi
 Masashi Kawana, Kurashiki-shi
 Takashi Kosukegawa, Okayama-shi, Japan
[21] Appl. No. 765,606
[22] Filed Oct. 7, 1968
[45] Patented Jan. 26, 1971
[73] Assignee Kawasaki Steel Corporation and Kawasaki Dockyard Co., Ltd.

[54] WASTE GAS LEAKAGE PREVENTIVE DEVICE IN THE BASIC OXYGEN FURNACE
 4 Claims, 5 Drawing Figs.
[52] U.S. Cl................................................ 266/15, 266/36
[51] Int. Cl................................................ C21c 5/40
[50] Field of Search................................................ 266/35, 36, 15, 16, 17, 18, 19

[56] References Cited
UNITED STATES PATENTS

| | | | |
|---|---|---|---|
| 3,170,017 | 2/1965 | Namy............................ | 266/36X |
| 3,325,160 | 6/1967 | Eklund.......................... | 266/36X |
| 3,358,983 | 12/1967 | Wegscheider et al......... | 266/35 |
| 3,372,917 | 3/1968 | Richardson................... | 266/15 |

*Primary Examiner*—Frank T. Yost
*Attorney*—Sughrue, Rothwell, Mion, Zinn & MacPeak

ABSTRACT: A movable cylindrical shield is slidably mounted on the lower end of a hood over the open end of a converter and cooperates with fluent filled channels to provide a gas tight seal. In action, suction pipes are provided to collect any gas which is not collected by the hood.

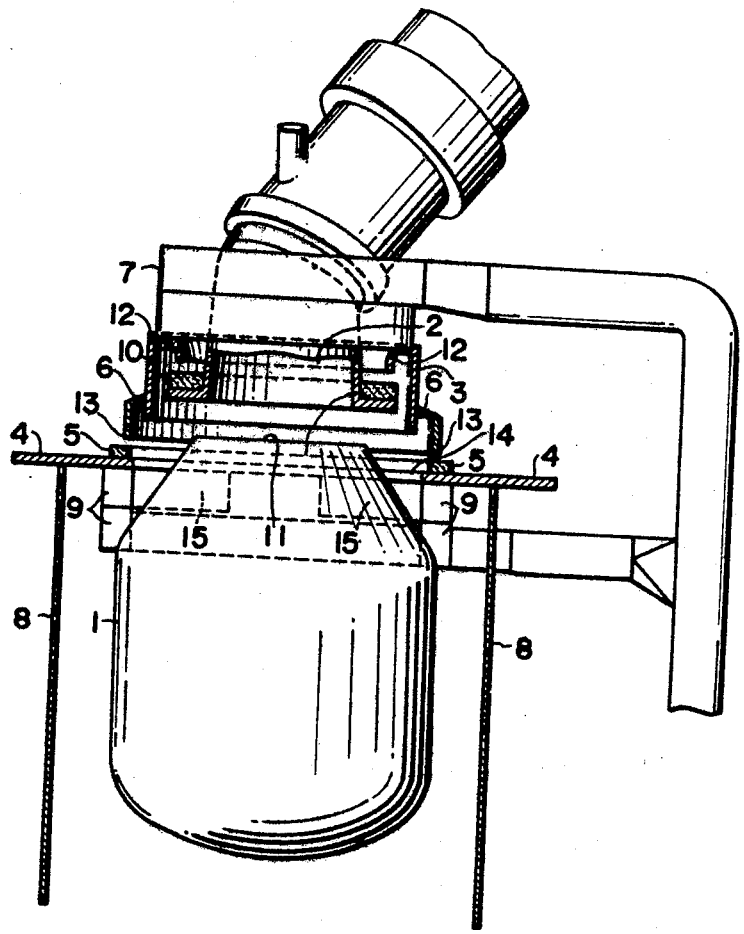

PATENTED JAN 26 1971 3,558,116

WASTE GAS LEAKAGE PREVENTIVE DEVICE IN THE BASIC OXYGEN FURNACE

The present invention relates to an improvement of the hood portion of the basic oxygen furnace having a device for recovering the waste gas from the converter in imperfect combustion condition.

A waste gas recovering device for a converter is well known and captures the gas exhausted out of the converter, so that it may not be mixed with the atmosphere, by controlling the gas pressure in the hood, recovers the gas into a gas holder after cooling and dusting the gas, and utilizes the recovered gas for fuel, chemical material and the like.

Since the portion between the furnace port and the hood portion cannot be perfectly shielded because of the accumulation of the slag spouted out of the furnace and since the converter must be inclined when the steel is removed therefrom and when material is put in, as well as the imperfect controlling of the gas pressure in the hood corresponding to the large variation of the gas pressure in the converter, waste gas, including smoke, leaks out of the portion between the furnace port and hood portion. This leakage of the waste gas also passes out of the converter building into the open air and causes an undesirable environment from a view point of public nuisances. The present invention is to solve these problems by capturing the waste gas.

In the prior art, a device was provided for preventing the smoke and gas from leaking out of the converter, for instance as shown in FIG. 1, but in this device the bottom portion could not be separated. In this construction a part of hood portion *b* is made demountable from the furnace port *a* for putting in brick and a heat shield *f* is disposed around the lower hood *d* which is ordinarily fixed to the floor *c* for preventing the smoke and gas from leaking upward. The upper hood *e* connected to said lower hood *d* is demountable. There are also devices known for capturing the leaking waste gas from between an inner cylinder and outer cylinder wherein the hood is made of a double construction and the waste gas is captured through the inner cylinder. In the former device it is difficult to take brick into the furnace for it is impossible to lower the floor *c* because of the fixed lower hood portion *d*. In the latter device the structure of the hood becomes complicated because of the accessories attached to the hood portion.

It is an object of the present invention to provide a device for preventing the waste gas from leaking out of the basic oxygen furnace.

The subject matter of the present invention consists in a waste gas leakage preventing device in the basic oxygen furnace comprising a shielding plate fixed to the lower portion of a vertically movable cylinder mounted on the lower end of the waste gas recovering hood of the basic oxygen furnace, a shield box in which the lower end of said shielding plate extends disposed on the brick take-in floor near the furnace port or on the heat proof plate, and a leaking waste gas capturing pipe disposed downwardly of said shield box.

The invention will be better understood by the following description taken in conjunction with the accompanying drawings in which:

FIG. 1 is schematic view showing a conventional structure of a waste gas recovering hood portion of a converter;

FIG. 2 is a front elevation view partly in section of the waste gas leakage preventive device of the basic oxygen furnace in accordance with the present invention;

FIG. 5 is a schematic view showing another embodiment of the preventive device in accordance with the present invention.

Figure 4:
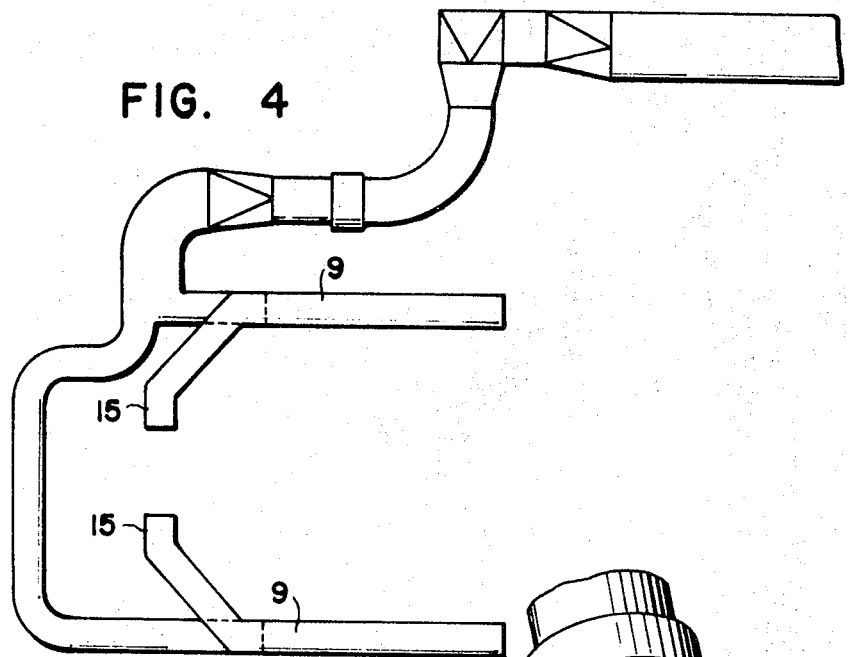
FIG. 4 is a plan view of the leaking waste gas capturing pipe of the same.
Figure 3:
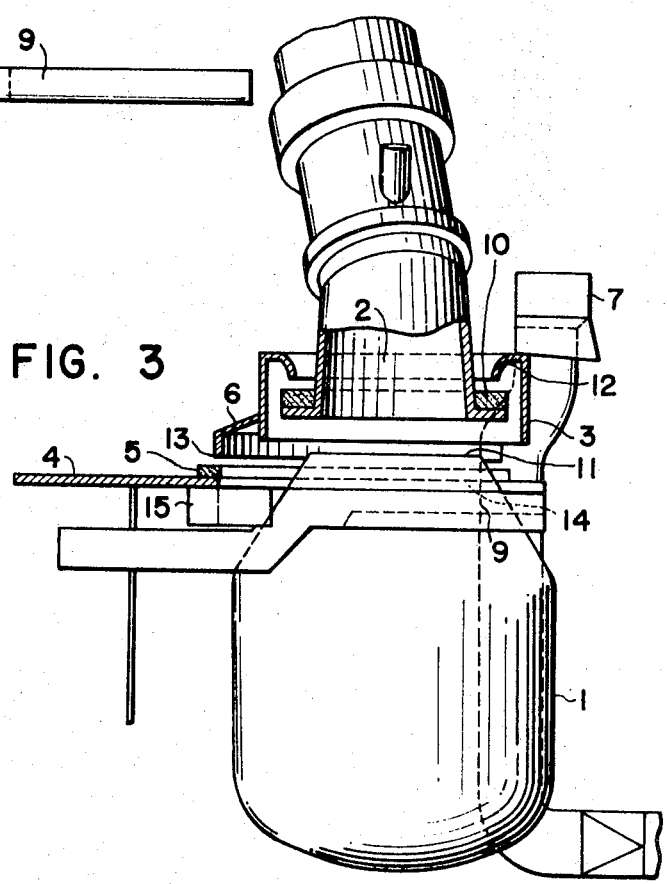
FIG. 3 is a side view of the same.

Referring to FIG. 2 showing an embodiment of the present invention, a vertically movable cylinder 3 is slidably mounted on the lower end of the waste gas recovering hood 2 of the basic oxygen furnace. The upper end of said cylinder 3 is bent inward so that the edge 12 of the bent end faces a shield box 10 disposed at the lower end of said waste gas recovering hood 2. A shielding plate 6 is mounted on the lower end of said cylinder 3 so that the lower end 13 of said shielding plate 6 extending downwardly faces a shield box 5 disposed on the brick take-in floor 4 in the vicinity of furnace port 11 inwardly of the heat shield 8 of the basic oxygen furnace 1, whereby said edge 12 of the bent end of said cylinder 3 and said lower end 13 of said shielding plate 6 are brought into said shield boxes 10 and 5, respectively. The shield boxes are formed into rain gutterlike boxes upwardly open and are filled with powder such as sand or liquid such as water for sealing. When the edge 12 of the bent end of said elevating cylinder and lower end 13 of said shielding plate 6 are brought into these shield boxes 10,5, the shield boxes completely prevent the gas within the furnace from leaking therefrom. Leaking waste gas capturing pipes 9 are provided under the shield box 5. From the capturing pipes 9, branch pipes 15 are extended inwardly from both sides thereof and sufficiently draw the leaking waste gas toward these pipes. The capturing pipes 9 may be pipes provided with a plurality of suction holes on the pipe wall thereof. In the embodiment shown in FIG. 2 the capturing pipes 9 are disposed on the underside of the floor 4 for the leaking gas spreads downwardly from the floor 4 on which the shield box 5 is disposed, and in another embodiment shown in FIG. 5 the capturing pipes 9 are disposed within the heat shield 16 below the shield box 5 which also disposed on the heat shield 16. The converter must be inclined forward when the material is put therein. That is, as the converter must be inclined rightward in FIG. 3, the brick take-in floor 4 is provided with a cutout portion 14 so that the converter may be operated and inclined without trouble. Therefore, in the front part of the converter, said leakage preventive device cannot be mounted thereto. However, another waste gas capturing pipe 7 is disposed at the upper portion of the front side of the converter for the purpose of capturing the waste gas produced when the molten iron is put into the converter.

According to the construction as described above, the waste gas is sucked into the waste gas recovering hood 2 by controlling the pressure within the hood 2 after the cylinder 3 is moved down along the waste gas recovering hood 2 to the position where the edge 12 of the bent end of the cylinder and the lower end 13 of the shielding plate 6 are brought into the shield boxes 10 and 5. But in case the pressure is not perfectly controlled in response to the variation of conditions in the converter, the waste gas leaks out of the furnace port and spread all over under the brick take-in floor 4. In such case, the leaking waste gas is sucked through openings of the capturing pipes 9 extending under the shield box 5 so that the smoke will not spread over the converter or up to the working floor. The leaking waste gas flowing out forwardly from the converter is easily sucked upwardly by the capturing pipe 7.

In accordance with the present invention, the waste gas leaking out of the converter between the waste gas recovering hood 2 and the furnace port 11 is almost completely captured, and problems affecting the environment are simply solved. Moreover, since the brick take-in floor 4 can be disposed near the furnace port 11, the work involving handling of the brick is simplified.

We claim:

1. A waste gas leakage preventing device for a basic oxygen furnace of the type having an upwardly open, horizontally tiltable vessel partially surrounded by a heat shield having a floor portion disposed adjacent the uppermost end thereof comprising a vertically extending cylindrical hood means disposed in spaced vertical relation to said vessel, a vertically movable cylinder slidably mounted on said hood member, shield box means mounted on said hood means and on said heat shield below the top of said vessel for cooperating with the edges of said cylinder to provide a gas tight hood extension, said cylinder being movable upwardly along said hood means to provide access into said vessel.

2. A device as set forth in claim 1 further comprising suction pipe means disposed below said shield box means mounted on said heat shield.

3. A device as set forth in claim 2 further comprising additional suction pipe means disposed adjacent said cylinder and above said vessel on the side thereof not surrounded by said heat shield.

4. A device as set forth in claim 1 wherein said shield box means are comprised of upwardly open annular channels adapted to be filled with a fluent material for cooperation with said cylinder, the upper end of said cylinder being turned inwardly and downwardly for cooperation with its respective shield box means.